United States Patent

Moss

[11] 4,103,160
[45] Jul. 25, 1978

[54] OPTICAL SCANNING EQUIPMENT

[75] Inventor: Colin Roy Moss, Dunstable, England

[73] Assignee: Hawker Siddeley Dynamics Limited, England

[21] Appl. No.: 97,401

[22] Filed: Nov. 17, 1970

[30] Foreign Application Priority Data

Nov. 19, 1969 [GB] United Kingdom ............... 46391/69

[51] Int. Cl.² ........................ H01J 31/49; G02B 13/08
[52] U.S. Cl. ..................... 250/334; 250/332;
346/108; 350/181; 350/191
[58] Field of Search ................... 350/83.3 R, 83.3 H,
350/83.31 R, 219 F, 219 R, 220 SP, 234, 235,
332, 334, 353, 136, 160, 22, 26, 175 FS, 181,
191; 343/5 CM; 346/108

[56] References Cited

U.S. PATENT DOCUMENTS

| 2,412,165 | 12/1946 | McDermott | 250/83.3 H |
| 2,423,885 | 7/1947 | Hammond | 250/83.3 H |
| 3,242,484 | 3/1966 | Russell | 343/5 CM |

*Primary Examiner*—S. C. Buczinski
*Attorney, Agent, or Firm*—Dowell & Dowell

[57] ABSTRACT

Line-scanning equipment, especially for aerial photography of terrestrial scenes, has an infra red scanner which causes the scanning beam to sweep repeatedly across the scene in the direction at right angles to the direction of travel of the aerial vehicle. As the angle of departure of the scanning beam from the vertical increases the strip of the scene being viewed in any one scanning cycle widens progressively so that the total strip has the shape of a 'bow-tie'. A mechanically-actuated shutter is provided to restrict the recorded image to only that part of the recording beam information which is derived from a parallel-sided ground area within the 'bow-tie'; and a correcting lens is employed to ensure that the final image is parallel-sided.

8 Claims, 10 Drawing Figures

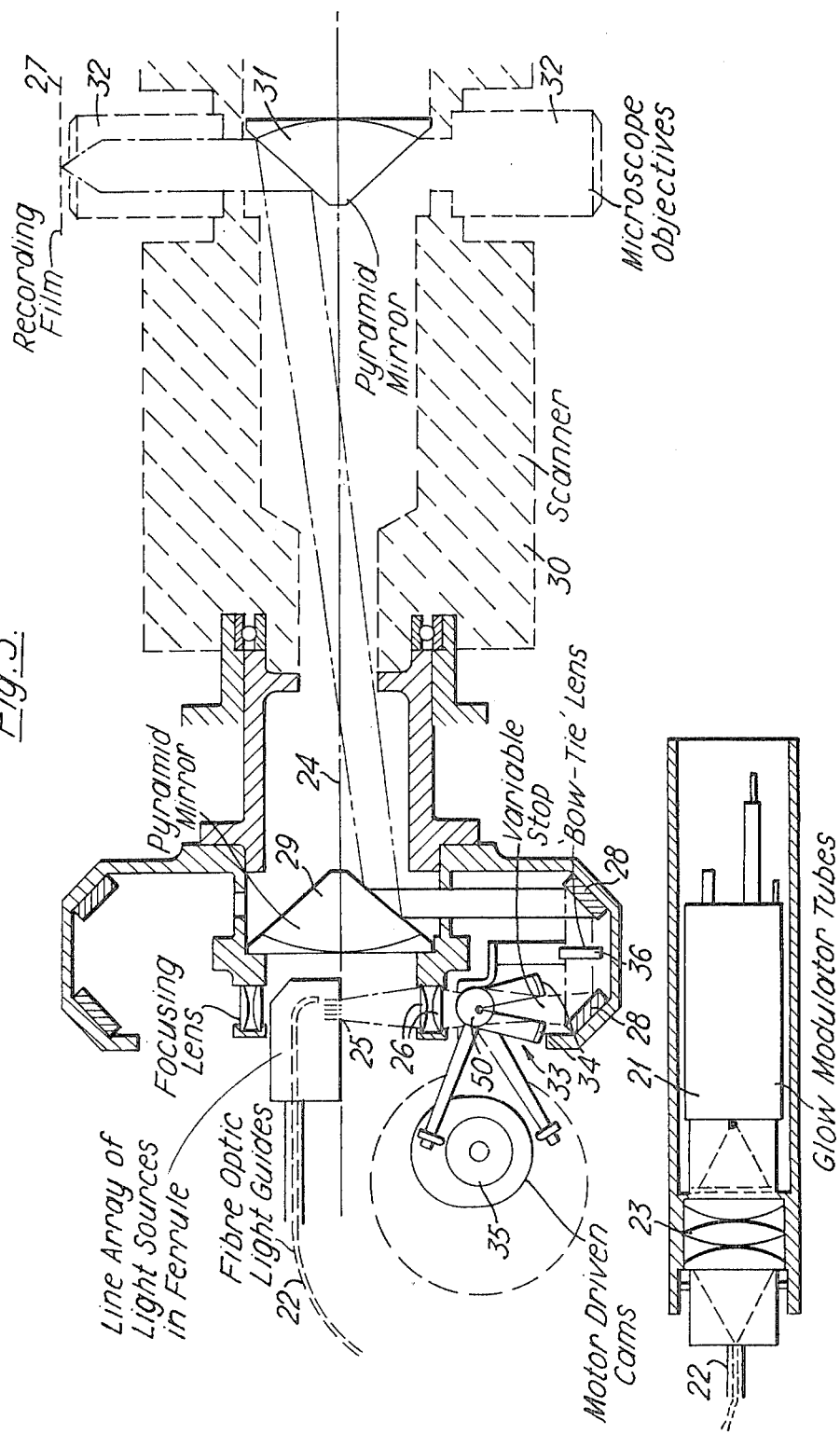

Curvature is a function of Sec 2θ

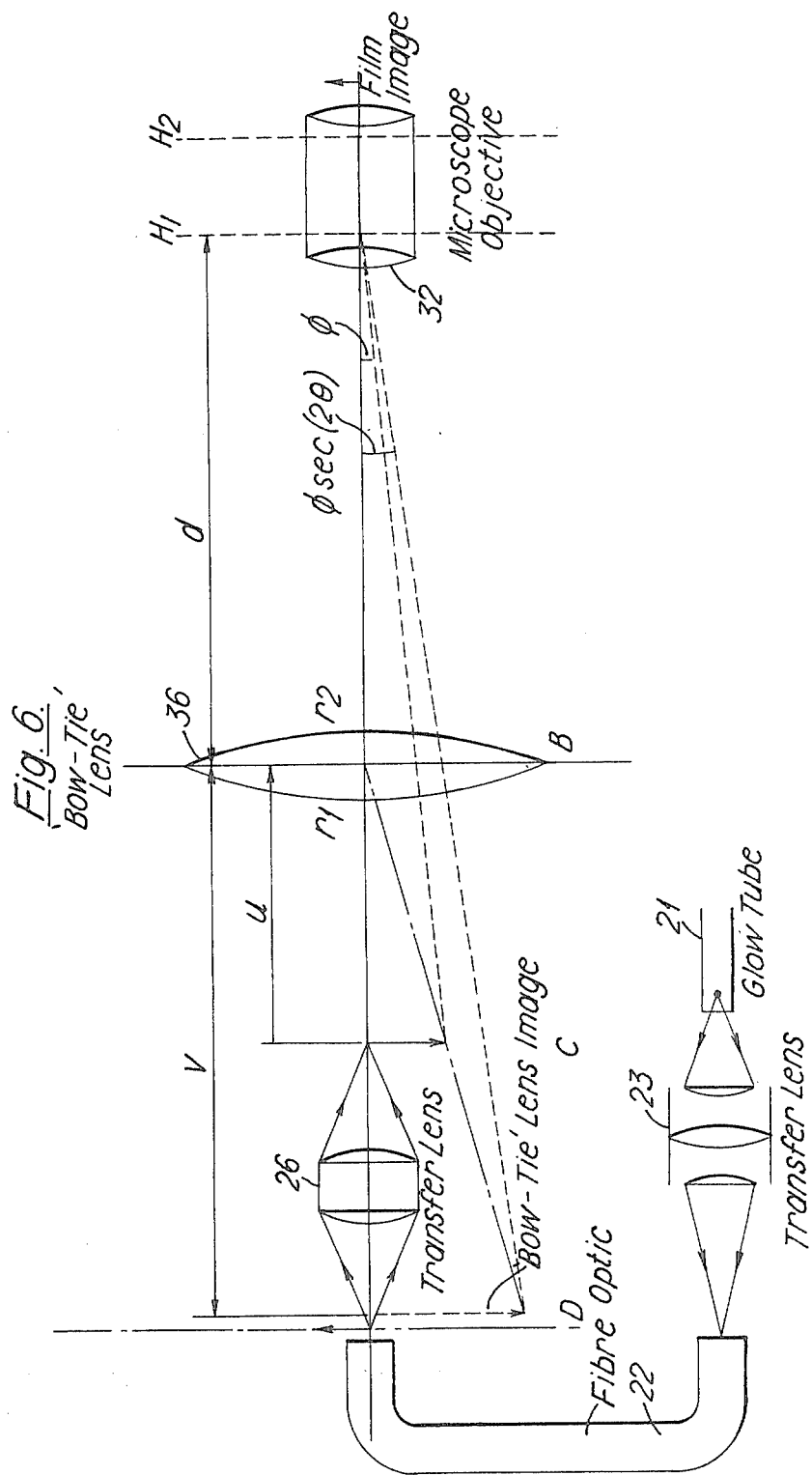

OPTICAL SCANNING EQUIPMENT

This invention relates to scanning equipment for viewing or illuminating a scene over a wide angle, especially in connection with obtaining a photographic record of a terrestrial scene passing beneath an airborne vehicle by infra red line scanning technique.

It is a known feature of such linescan systems that as the look angle departs from the vertically downwards mode the area of ground seen by the system at any instant increases as the angle increases. The rate of increase is proportional to sec $\theta$ where $\theta$ is the angle between the direction of look and a line drawn vertically downwards from the aircraft to the ground. It follows that over one complete scan in a plane perpendicular to the direction of flight, the total area of ground seen by the system is in the shape of a 'bow-tie'.

A series of consecutive scans thus produces an overlap effect. The overlap between consecutive scans for non-zero $\theta$ is inevitable if full ground coverage is to be maintained even for low $\theta$ values.

Each scan is reproduced as a transverse strip on a moving photograhic film. This strip has constant width for all values of $\theta$ and contains within it all the information derived from the 'bow-tie' area of the ground below. Clearly, if the 'bow-ties' of consecutive scans overlap, any item of signal information from the ground will appear on two or more strips on the photographic film.

According to the present invention, a correcting optical element is employed having a curvature varying in accordance with the appropriate function of the angle $\theta$, in conjunction with a shutter or stop means operative to restrict the recorded image to that part of the recording beam information which is derived from a parallel-sided ground area within the 'bow-tie' area.

The nature of the invention will be better understood from the following description, given by way of example, of arrangements for carrying it into practical effect, reference being had to the accompanying drawings, in which.

Figure 1A:
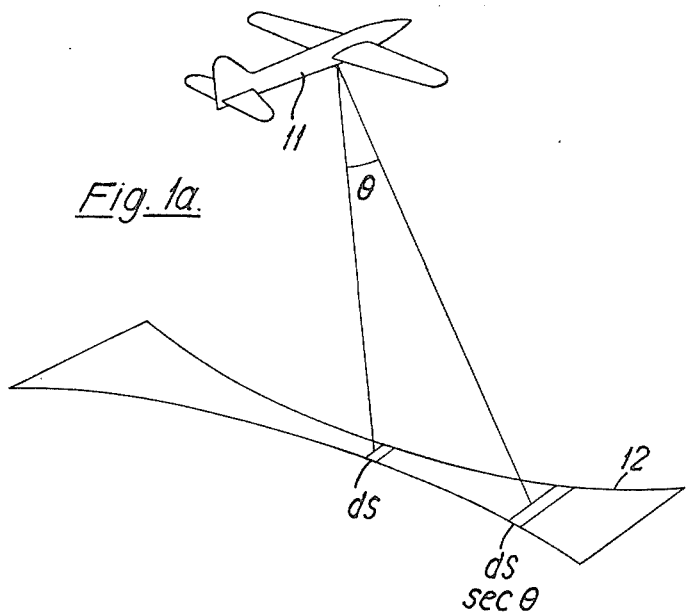
FIG. 1a illustrates the 'bow-tie' effect.
Figure 1B:
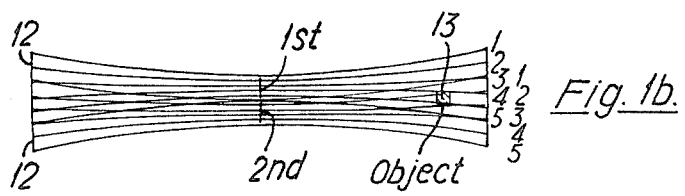
FIG. 1b shows the result of consecutive 'bow-tie' scans.
Figure 1C:
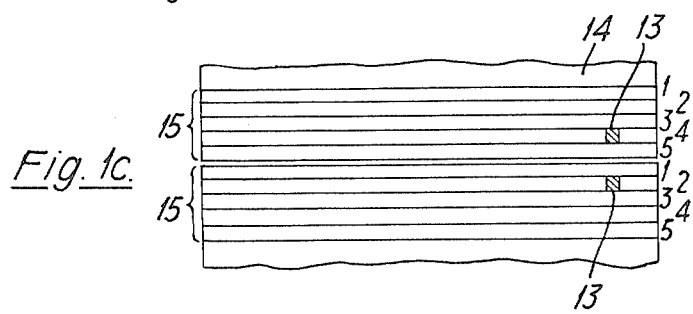
Figure 2A:
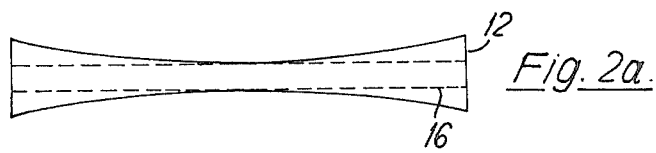
Figure 2B:
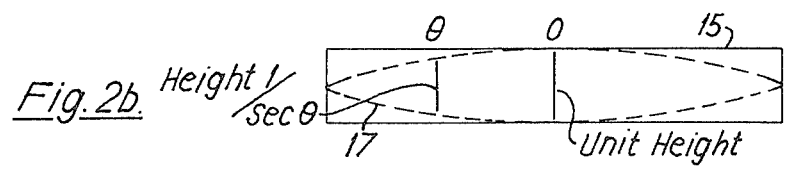
Figure 4:
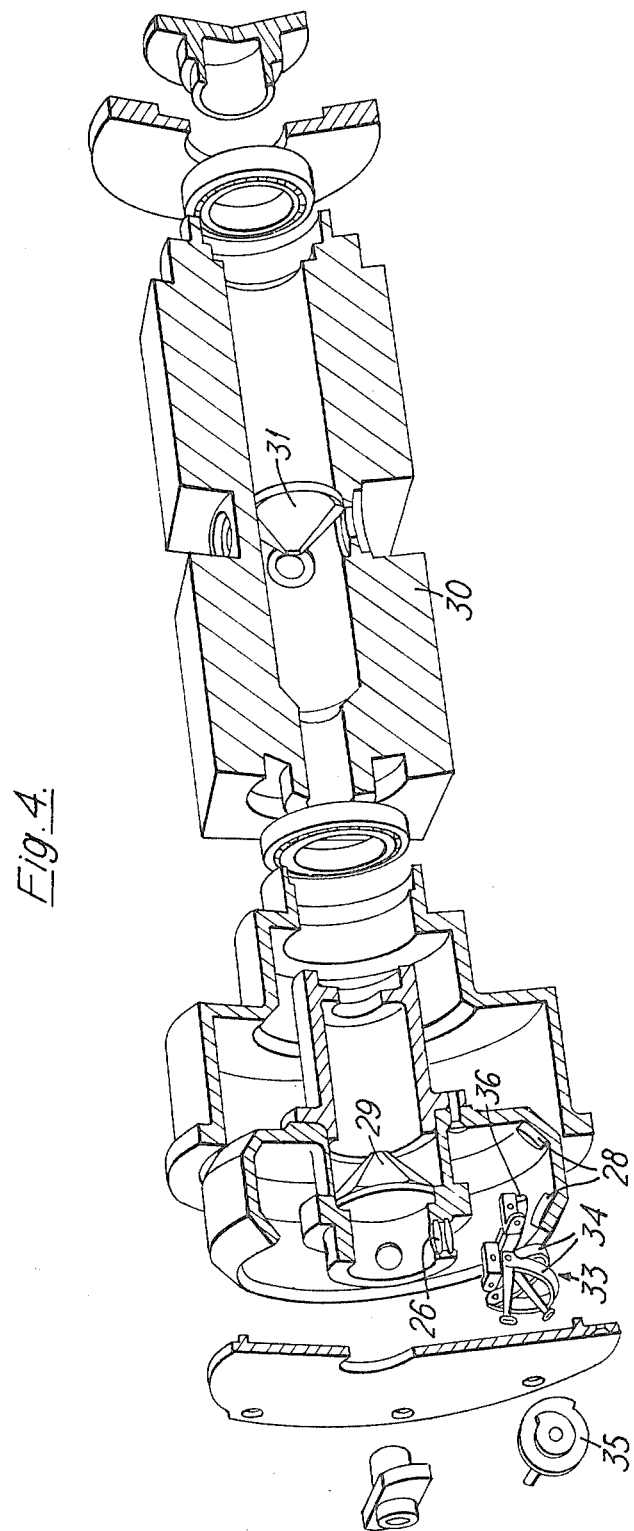
Figure 5:
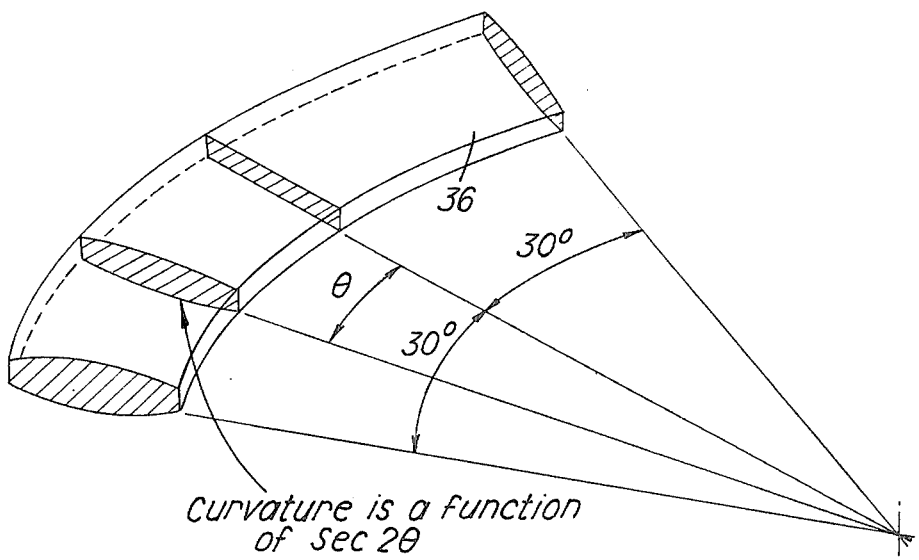
Figure 7:
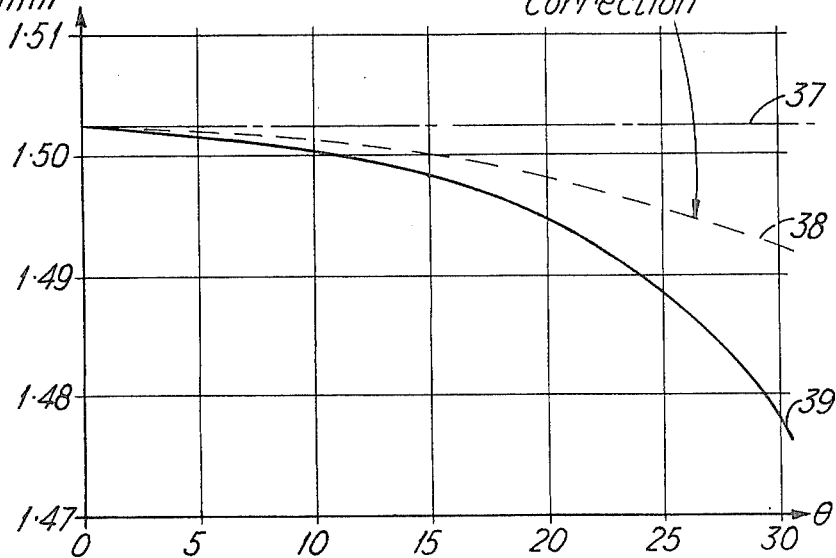

FIG. 1c is a representation of the information from consecutive 'bow-tie' scans recorded on film, FIG. 2a shows the actual 'bow-tie' ground area scanned and also the parallel-sided ground area within this bow-tie which should ideally be the scanned area, FIG. 2b is a diagram of how the ground areas of FIG. 2a appear when recorded by a conventional system, FIG. 3 is a diagram of apparatus embodying the invention, FIG. 4 is an exploded pictorial view of the principal parts of the apparatus of FIG. 3, FIG. 5 illustrates the nature of the 'bow-tie' correction lens, FIG. 6 is an optical function diagram of the apparatus, and FIG. 7 is a graph showing a particular variation characteristic of the lens of FIG. 5.

Referring to the drawings, FIG. 1a shows how, in a conventional system of scanning terrain from an aircraft 11, the scanned strip of ground area 12 widens as the scanning beam departs increasingly from the vertical. If the angle of departure from the vertical is $\theta$ and the width of the element of area scanned when the beam is vertical is ds, the width of the scanned element grows with increase in $\theta$ in either direction and is represented by ds sec $\theta$, giving the characteristic 'bow-tie' appearance of the complete area 12 scanned. FIG. 1b illustrates how two consecutive multi-channel scans, represented by the designations 1st and 2nd, overlap to a considerable extent toward the extremities of the 'bow-ties', even though there is no overlap at the middle where $\theta$ is zero. The two consecutive scanned areas are each shown as five strips side by side, it being assumed that five-channel scanning is being employed. And it will be observed that, because of the overlap, an object 13 on the ground appearing, for example, in channel 4 of the 1st scan at the position shown will appear again in channel 2 of the 2nd scan. When the information obtained from the scanning is recorded on film 14 each 'bow-tie' scan 12 occupies a separate parallel-sided widthwise strip 15 of the film record, with the result that the object 13 becomes two separate objects appearing in consecutive strips of the film.

FIG. 2a shows again the 'bow-tie' plan area 12 scanned by the conventional system, and within it the parallel-sided area 16 to which it is intended to confine the scan by means of the system according to the invention now to be described. FIG. 2b illustrates how this would appear recorded by the conventional system. The 'bow-tie' area 12 becomes the parallel-sided strip 15 while the strip 16 reduces to the lens-shaped area 17 that diminishes towards its extremities. The width of the lens-shaped area 17 for any particular value of $\theta$ is proportional to $1/\sec \theta$. If an optical system having a magnification proportional to sec $\theta$ is used to magnify the lens-shaped area 17, the image produced by this optical system will once again be a parallel-sided strip containing information derived from a constant area of ground for all values of $\theta$.

FIG. 3 is a diagram of the portion of the recording mechanism of line scan equipment which includes the correcting optical system.

The intensity of a glow-tube array 21 is modulated in accordance with the infa red signal data received from the ground. Light from the individual glow-tubes is focussed on to the ends of respective conduits in a bundle of fiber optics conduits 22 using a transfer lens 23 (see also FIG. 6). This lens 23 has been designed as a triplet in order to minimise the effects of spherical aberrations. The light then passes along the fiber optics conduits 22 to terminations thereof lying on the axis 24 of the recording mechanism. These latter terminations are arranged in a line array co-incident with this axis, as shown at 25. Since each fiber optics termination has a cross-section of 0.075cm, the line array at 25 has dimensions 0.375cm × 0.075cm, assuming five glow-tubes 21 are used. This array presents as a modulated light signal the infra red pattern from each instantaneously scanned fore and aft strip or increment of the total laterally-extending 'bow-tie' area.

The line array light source 25 remains stationary for all values of $\theta$ since it lies on the axis 24 of the recording system. It is necessary to produce an image of the source 25 at some position off the axis of the system in order that the image position may change with $\theta$. This is accomplished by using a doublet transfer lens 26. The image produced by this transfer lens 26 may be considered as that produced on the film 27 by the recording mechanism, ignoring the intervening optical system. In fact, the beam is folded back toward the axis 24 of the recording system by plane mirrors 28 so as to strike a pyramid mirror 29, whence it is reflected along the general direction of the axis 24 and through the hollow rotary scanner 30 on to a second pyramid mirror 31 rotating with the scanner, the mirror 31 then reflecting the beam radially out to four microscope objectives 32 also rotating with the scanner past the recording film 27. The axial dimension of the image is 0.375M cm, where M is the magnification of the transfer lens 26. For a complete scan. the image will have the form of a cylindrical section of radius equal to the distance between the image and the system axis 24 and it will contain all the information derived from the 'bow-tie' area of the ground below.

FIGS. 3 and 4 show a shutter 33 inserted in the system between the transfer lens 26 and the first of the plane mirrors 28 to coincide with the surface generated by the transfer lens image. This shutter comprises two arcuate shutter blades 34 angularly movable toward and away from one another about a pivot axis 50. The function of this shutter is to restrict the image dimensions to those enclosed within the area 17 of FIG. 2b. In order to understand fully the operation of this shutter, two other factors must be mentioned: firstly, although the total scan of the scanning mechanism is 120°, this is, for constructional reasons, reproduced on the film using a 60° scan of the recording mechanism; secondly, the shutter must incorporate a mechanism for variation of the V/h value to which the system is set.

The aperture of the shutter at any particular point will be proportional to $1/\sec2\theta$. Thus for $\theta$ equal to $\pm 45°$ the aperture will be zero. The aperture will also be a function of V/h. The aperture at any given point is thus equal to $0.0375M.K\ V/h\sec2\theta$, where K is a constant equal to $1/(V/h)\max$.

The fact that the aperture will be zero, for all values of V/h, when $\theta$ is equal to $\pm 45°$ means that the two shutter blades 34 may be angularly moved about an axis passing through the two points corresponding to $\theta$ equal $\pm 45°$. The shutter blades 34, which have their operative edges in respective planes containing the shutter pivot axis, are operable by motor-driven cams 35. By this means the shutter is opened and closed to generate apertures corresponding to various values of V/h. The $1/\sec2\theta$ condition for the variation of aperture with $\theta$ will be obeyed to a first order approximation.

A 'bow-tie' lens 36 of variable curvature, shown in FIG. 3 and in greater detail in FIG. 5, is placed between the plane mirrors 28 to magnify the transfer lens image in the proportion of $\sec2\theta$ and thereby reform the image area passed by the shutter into a parallel-sided area. An optical function diagram of the system with the 'bow-tie' lens is shown in FIG. 6. $H_1$ and $H_2$ represent the primary and secondary focal planes of the microscope objective 32, B the position of the 'bow-tie' lens, C the transfer lens image, and D the 'bow-tie' lens image. Let the angular subtense of the transfer lens image at $H_1$ be $\phi$. The angular subtense of the 'bow-tie' lens image must be $\phi \sec2\theta$ to a first order approximation. Let $BH_1$ be $d$, $BD$ be $v$, and $CB$ be $u$.

Then $$\tan(\phi \sec 2\theta) = \frac{h}{d + v}$$

where $h$ is the height of the 'bow-tie' lens image. Now the height of the transfer lens image is 0.375M centimeters.

Using the relationship $\frac{\text{object height}}{\text{image height}} = \frac{\text{object distance}}{\text{image distance}}$ it will be seen that $\frac{h}{0.375M} = \frac{v}{u}$ ∴ substituting, $\tan(\phi \sec2\theta) = \frac{0.375Mv/u}{d + v}$ ∴ $d(\tan[\phi \sec2\theta]) = v\left[\frac{0.375M}{u} - \tan(\phi \sec2\theta)\right]$ ∴ $v = \frac{d.\tan(100 \sec2\theta)}{\frac{0.375M}{u} - \tan(\phi \sec2\theta)}$ Now $\frac{1}{f} = \frac{1}{v} - \frac{1}{u}$ (New Cartesian System)

∴ $\frac{1}{f} = -\frac{[0.375M/u - \tan(\phi \sec2\theta)]}{d \tan(\phi \sec2\theta)} - \frac{1}{u}$ $= -\frac{0.375M - (u - d)\tan(\phi \sec2\theta)}{u.\ d.\ \tan(\theta \sec2\theta)}$ Now $\frac{1}{f} = (\mu - 1)\left[\frac{1}{r_1} - \frac{1}{r_2}\right]$ where $\mu$, $r_1$ and $r_2$, are the refractive index, and radii of curvature of the 'bow-tie' lens respectively.

Put $r_2 = -r_1$ (equal curvature of surfaces)

$\frac{1}{f} = (\mu - 1)\frac{2}{r_2}$ ∴ $r_2 = 2(\mu - 1)f$ substituting $r_2 = \frac{2u(\mu - 1)d.\tan(\phi \sec2\theta)}{-(u - d)\tan(\phi \sec2\theta) - 0.375M}$ This expression gives the required radius of curvature of the surfaces of the 'bow-tie' lens as a function of $\theta$.

It should be noted that in this optical system the new Cartesian System requires that $v$ should in fact be negative, see FIG. 6. Under the new Cartesian System $u$ will in this optical system be negative, making $r_2$ also negative, i.e. the 'bow-tie' lens is a bi-convex lens, see again FIG. 6.

The 'bow-tie' lens can be manufactured by injection moulding technique using a polycarbamate material of refractive index 1.49.

The variation in optical path length between the 'bow-tie' lens image and $H_1$ with $2\theta$ results also in a variation in the image distance of the microscope objective with $2\theta$. A typical graph of this variation is shown at 39 in FIG. 7. It will be appreciated that, since the 'bow-tie' lens is basically a cylindrical lens, there will be no corresponding variation in optical path length in the surface perpendicular to the curvature of the lens. The image distance of the microscope objective will therefore remain constant in this surface (this image distance is shown at 37 in FIG. 7). This will cause an astigmatic effect to occur as $2\theta$ increases towards 60°, but by suitable contouring of the film gate it may be reduced to negligible proportions. With the film gate contoured as shown at 38 in FIG. 7, the maximum astigmatic spot size will be 0.001cm.

So far as possible variation of exposure of the film with change in magnification of the 'bow-tie' lens is concerned, it can be shown that this is no problem.

I claim:
1. Line-scanning equipment for scanning a scene over a wide angle, especially in connection with obtaining a photographic record of a terrestrial scene passing be- neath an aerial vehicle, wherein the scene is scanned repeatedly in a direction at right angles to the direction of travel of the equipment relative to the scene being scanned and the angle $\theta$ of the scanning beam relative to a line generally perpendicular to the nominal plane of the scene being scanned repeatedly varies between zero and a maximum, whereby the area scanned during each complete scan has a "bow-tie" shape, characterized in that a correcting optical lens is employed having a curvature varying in accordance with a secant function of the angle $\theta$, in conjunction with shutter means operative to restrict the recorded image to that part of the recording beam information which is derived from a parallel-sided ground area within the "bow-tie" area.

2. Equipment according to claim 1, wherein the correcting lens has a curvature which magnifies the area scanned to a variable extent in accordance with the function sec $2\theta$.

3. Equipment according to claim 1, comprising a rotary scanner, means generating on the axis of the rotary scanner, as a modulated light signal source, the information from each instantaneously scanned strip of the total 'bow-tie' area, and an optical system producing, for the purpose of recording, an image of said modulated light signal source at a position off the axis of the scanner, and wherein the correcting lens is incorporated in said optical system.

4. Equipment according to claim 3, wherein the modulated light source generating means comprises a bundle of fiber optics conduits, with their output ends disposed in a line array coincident with the axis of the scanner, and their input ends receiving light from individual glow-tubes focussed on to the ends of respective conduits, the light intensity outputs of the glow-tubes being controlled in accordance with infra red scanning signal data received from the scene being scanned.

5. Equipment according to claim 3, wherein the optical system produces a beam which is directed generally along the axis of the scanner and is then reflected out radially by a plurality of lens means rotating with the scanner so as to generate a plurality of radial recording beams which sweep widthwise in succession across a film record medium that travels in a direction parallel to the scanner axis.

6. Equipment according to claim 3, wherein the said shutter means is disposed in the light beam path of said optical system and comprises two curved shutter blades which are angularly movable toward and away from one another in synchronism with the scanner rotation.

7. Equipment according to claim 6, wherein the operative edges of the shutter blades lie in respective planes containing the shutter blade pivot axis.

8. Equipment according to claim 1, wherein the correcting optical element is a bi-convex lens having radii of curvature according to the mathematical formula $$r = \frac{2u(\mu - 1)\, d.\, \tan(\phi \sec 2\theta)}{-(u - d) \tan(\phi \sec 2\theta) - 0.375M}$$

* * * * *